Feb. 29, 1944.    W. F. STAHL    2,343,096
METHOD OF FORMING POLYGONAL TUBULAR BODIES
Filed Dec. 3, 1941
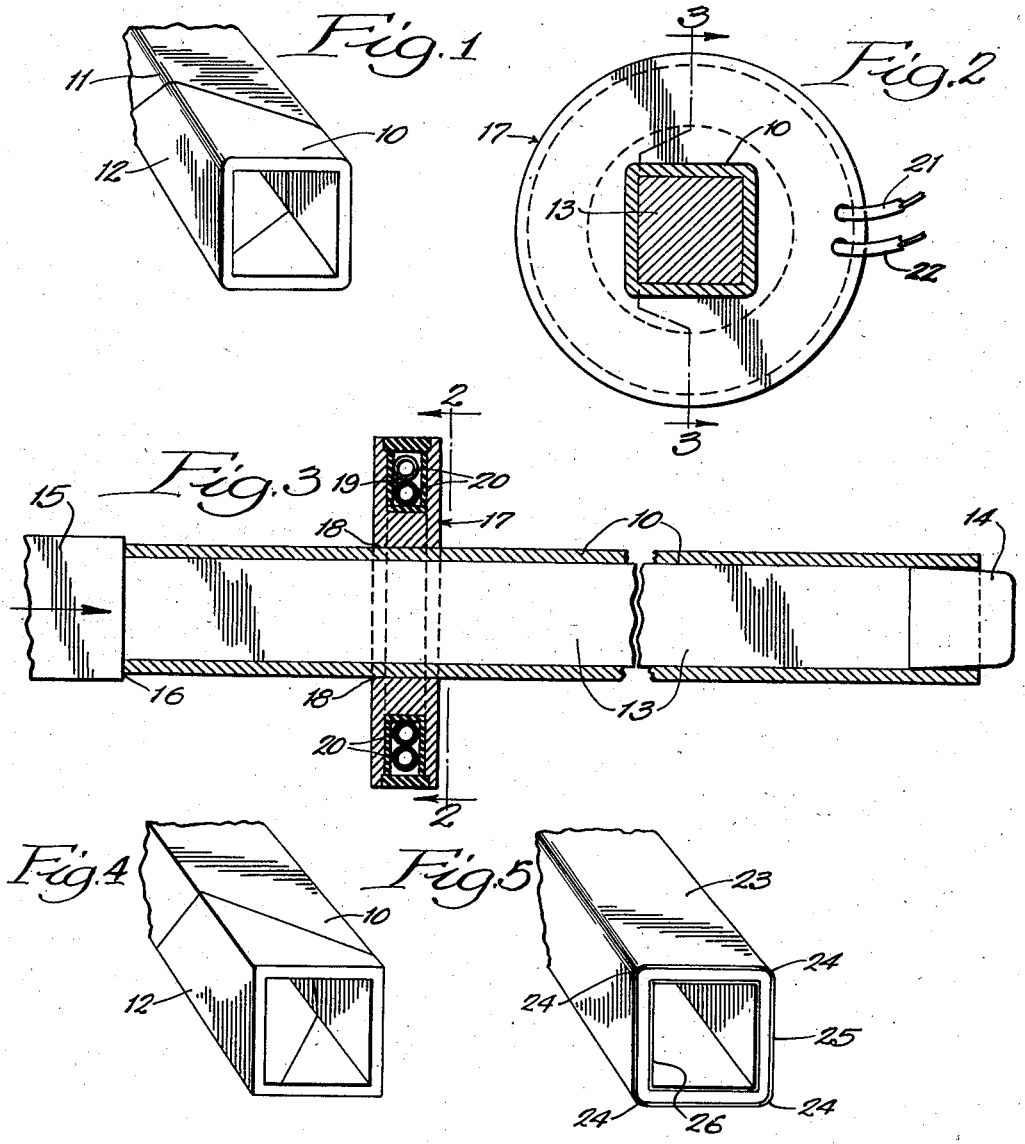

Patented Feb. 29, 1944

2,343,096

UNITED STATES PATENT OFFICE 2,343,096

METHOD OF FORMING POLYGONAL TUBULAR BODIES

William F. Stahl, Evanston, Ill.

Application December 3, 1941, Serial No. 421,417

4 Claims. (Cl. 93—83)

This invention relates to a method of forming polygonal tubular bodies and more particularly to the treatment of laminated paper tubes to produce a tubular structure of precise dimensions.

An object of the invention is to form tubular bodies of uniform and predetermined dimensions. Another object is to provide a method for removing irregularities in polygonal tubular bodies of laminated paper. Still another object is to prepare tubular bodies of laminated paper of substantially precise dimensions, particularly the inner dimensions.

Another object of the invention is to form polygonal tubular bodies of a desired shape and to permanently set the body in such shape. A further object is to provide for the treatment of slightly irregular tubular bodies of laminated paper to remove the irregularities therefrom and produce a body of substantially uniform and predetermined dimensions.

Other features and advantages will appear from the following specification and drawing, in which—

Figure 1 is a perspective view partly broken away of a paper tube to be treated in the invention; Fig. 2 is a transverse sectional view of the tube supported on a mandrel and received within a die, the die being shown in elevation and the view being taken along the line 2—2 of Fig. 3; Fig. 3 is a sectional view taken along the line 3—3 of Fig. 2; Fig. 4 is a perspective view partly broken away showing a tube after treatment in accordance with the invention; and Fig. 5 is a perspective view partly broken away of a modified product of the invention.

In the forming of tubular bodies of laminated paper and the like considerable difficultiy is encountered in producing a tube of precise and uniform dimensions and shape. This is particularly true when the tube is of polygonal cross section. Such tubes are usually prepared by winding strips of gummed tape or paper about a mandrel or base which is of the desired shape. The strips are wound helically about the mandrel to form a laminated paper tube. In such tubes, however, the angles and corners of the tube are often rounded or arcuate and portions between the corners which should be straight may often be slightly curved or otherwise irregular.

Slight irregularities in tubes of this type may present basic difficulties in the use of the tube, particularly if the tube is to be used as a core for a coil form or bobbin and is to receive a movable plunger within the same. In such instance, the irregularities of the tube will interfere with the movement of the plunger.

In accordance with the present invention, polygonal tubes of slightly irregular shape and contour may be subjected to a treatment which removes the irregularities from the tube and produces a body of substantially uniform and precise dimensions.

In the embodiment of the invention shown herein and illustrated in Figs. 1 to 4, a tube 10 is formed of helically wound strips 11 and 12 of gummed tape or paper, the tube as shown being substantially square in cross section. The strips of gummed tape are so wound as to produce a laminated wall for the tube and the winding operation results in a tube of slightly irregular dimensions. The tube 10 is placed on a mandrel 13 which is of the same cross section shape as the tube and is adapted to be snugly received therein. The outer dimensions of the mandrel are exact and precise and the mandrel is of the shape which it is desired to produce on the inner surface of the tube. The mandrel is equipped with an end portion 14 which is slightly tapered to facilitate the insertion of the mandrel in the tube. The mandrel may be carried by a shaft 15 which is equipped with a shoulder 16 against which the tube 10 may be received.

The mandrel 13 carrying the tube 10 is inserted in a die 17 which snugly receives the tube 10. The die 17 is equipped with a slightly tapered edge 18 at one side to permit the insertion of the mandrel and tube therein. A suitable heating element 19 is arranged within the die to heat the same. Preferably the heating element includes a resistance coil 20 and electrical connections 21 and 22 connecting the coil to a source of current.

The die 17 is equipped with an inner surface for receiving the paper tube which is of the cross section shape which it is desired to produce on the outer surface of the tube. Thus, the inner surface of the die may be in the form of a square and of dimensions corresponding to the outer dimensions of the tube. Preferably, the inner dimensions of the die are slightly less than the outer dimensions of the tube so that the tube is slightly compressed as it is inserted in the die.

When the mandrel carrying the tube is passed through the heated die, the tube 10 is shaped to conform to the surface of the mandrel and the die, the inner surface conforming to the shape of the mandrel and the outer surface conforming to the shape of the die.

The passing of the tube through the heated die apparently softens the adhesive which secures the laminations of the tube to each other and permits the tube to be permanently changed in contour. The precise dimensions of the tube which are obtained by the operation are permanently retained by the tube. The corner portions or angular portions of the tube, as seen in Fig. 4, may be accurately squared by this treatment.

The die 17 may be heated to any desired and suitable temperature. Thus the surface of the die which engages the paper tube may be maintained at a temperature of between 200° F. and 400° F., preferably at a temperature of approximately 300° F.

The tube which is to be treated may be of any suitable polygonal cross section and the die and mandrel should be of a corresponding shape. The terms die and mandrel are used in the broad sense and are intended to include respectively shaping means for the outer and inner surfaces of the tube.

If desired, the outer and inner surfaces of the tube may be of slightly different shapes, thus the die may be equipped with rounded corners and angles to produce, as seen in the modification of the invention shown in Fig. 5, a tube 23 having rounded corners 24 on the outer surface thereof. With this construction, the precise square inner surface of the tube is still obtained while, at the same time, the tube is strengthened by eliminating the sharp angled corners on the outer surface thereof.

The tube before being subjected to the operation may be treated with a suitable hardening material such as a synthetic resin which is thermo-setting in character. The resin may be applied, as shown in Fig. 5, to the outer and inner surfaces of the tube to form thin layers 25 and 26 thereon. Any suitable hardening material which is thermo-setting in character may be used. For example, a phenol-formaldehyde condensation solution may be used. When this product is applied to the tube and permitted to dry, the application of heat together with the pressure exerted by the die causes the material to set to form the insoluble infusible phenol-formaldehyde resin.

The application of a hardening material to the tube provides an insoluble infusible coating for the tube, firmly fixes the tube in the desired shape, and increases the resistance of the tube to friction.

By referring herein to the term of polygonal tubular body, hollow tubes having a plurality of sides are intended to be included.

Although the invention has been described in connection with certain specific embodiments thereof, these have been described in detail only for the purpose of illustration. It will be understood, therefore, that the method described is subject to many modifications and changes without departing from the spirit of the invention.

I claim:

1. A method of forming polygonal tubular bodies comprising providing a laminated hollow paper tube of slightly irregular polygonal cross section, placing the tube on a mandrel, the mandrel being of the polygonal cross section desired for the inner surface of the tube, and passing the mandrel with the tube thereon through a heated die having an inner surface of the polygonal cross sectional shape desired for the outer surface of the tube, the corner portions of the polygonal surface of the die being rounded and the die and mandrel being spaced apart by a distance slightly less than the thickness of the tube.

2. A method of treating a hollow paper tube of slightly irregular cross section, such tube being formed of laminated strips of paper secured together with an adhesive, comprising applying to the inner and outer surfaces of the tube a coating of a thermo-setting resin, placing the tube on a mandrel, the mandrel being of the cross sectional shape desired for the inner surface of the tube, and passing the mandrel with the tube thereon through a die having an inner surface of the polygonal cross sectional shape desired for the outer surface of the tube, the die being heated and being spaced from the mandrel by a distance slightly less than the thickness of the tube whereby the heat and pressure exerted on the tube as it passes through the die produce a setting of the resin coating.

3. A method of treating a hollow paper tube, comprising applying to the surface of the tube a coating of a thermo-setting resin, placing the tube on a mandrel, the mandrel being of the cross sectional shape desired for the inner surface of the tube, and passing the mandrel with the tube thereon through a die having an inner surface of the cross sectional shape desired for the outer surface of the tube, the inner surface of the die and the outer surface of the mandrel being of the same general cross sectional shape, the die being heated and being spaced from the mandrel by a distance slightly less than the thickness of the tube whereby the heat and pressure exerted on the tube as it passes through the die produce a setting of the resin coating.

4. A method of treating a hollow paper tube, comprising applying to a surface of the tube a thermo-setting coating, passing the coated tube on a mandrel through a heated die, the mandrel being of the cross sectional shape desired for the inner surface of the tube and the die having an inner surface of the cross sectional shape desired for the outer surface of the tube, the die being spaced from the mandrel by a distance slightly less than the thickness of the tube whereby the desired inner and outer surfaces are pressed into form and said coaitng is set.

WILLIAM F. STAHL.